US008376839B2

(12) United States Patent
Lesley et al.

(10) Patent No.: US 8,376,839 B2
(45) Date of Patent: Feb. 19, 2013

(54) GAMING MACHINE WITH IMPROVED LIGHTING ARRANGEMENT

(75) Inventors: Paul M. Lesley, Blue Island, IL (US); Jacob C. Greenberg, Elgin, IL (US); Walter E. Smolucha, Melrose Park, IL (US); Dorian A. Flowers, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 0 days.

(21) Appl. No.: 13/063,191

(22) PCT Filed: Oct. 19, 2009

(86) PCT No.: PCT/US2009/061128

§ 371 (c)(1),
(2), (4) Date: Mar. 9, 2011

(87) PCT Pub. No.: WO2010/048068

PCT Pub. Date: Apr. 29, 2010

(65) Prior Publication Data

US 2011/0201411 A1 Aug. 18, 2011

Related U.S. Application Data

(60) Provisional application No. 61/107,083, filed on Oct. 21, 2008.

(51) Int. Cl.
*A63F 9/24* (2006.01)
*G06F 17/00* (2006.01)

(52) U.S. Cl. ............ 463/25; 427/166; 348/556; 345/44; 463/46; 463/47; 463/16

(58) Field of Classification Search ........................ None
See application file for complete search history.

(56) References Cited

U.S. PATENT DOCUMENTS

| | | | | |
|---|---|---|---|---|
| 2,383,469 | A * | 8/1945 | Colbert et al. | 427/166 |
| 3,440,431 | A | 4/1969 | Cicchiello | 250/219 |
| 5,534,940 | A * | 7/1996 | Sato et al. | 348/556 |
| 5,916,450 | A * | 6/1999 | Muggli et al. | 216/4 |
| 6,564,108 | B1 * | 5/2003 | Makar et al. | 700/17 |

(Continued)

FOREIGN PATENT DOCUMENTS

| | | | |
|---|---|---|---|
| JP | 2008-012342 | A | 1/2008 |
| JP | 2008-079781 | A | 4/2008 |

(Continued)

OTHER PUBLICATIONS

Third Party Submission dated Oct. 18, 2011, 3 pages.

(Continued)

*Primary Examiner* — Paul A D'Agostino
(74) *Attorney, Agent, or Firm* — Nixon Peabody LLP

(57) ABSTRACT

A gaming machine includes a cabinet frame, a display, and an emotive lighting area. The cabinet frame has a cabinet surface visible to and facing a player position in front of the gaming machine. The display is mounted to the cabinet frame and is configured to display a randomly selected outcome from a wagering game. The emotive lighting area is integrated with the cabinet frame on the cabinet surface, proximate the display, and is separate from the display. The emotive lighting area includes a light source and a reflective surface, each of the light source and the reflective surface being concealed within the cabinet frame such that they are not viewable from the player position, the reflective surface configured to receive light directly from the light source and to reflect the light to a viewable area.

20 Claims, 8 Drawing Sheets

U.S. PATENT DOCUMENTS

| | | | | |
|---|---|---|---|---|
| 6,611,297 | B1 * | 8/2003 | Akashi et al. | 348/739 |
| 6,656,041 | B1 * | 12/2003 | Kaminkow et al. | 463/16 |
| 6,656,048 | B2 * | 12/2003 | Olsen | 463/25 |
| 6,695,703 | B1 | 2/2004 | McGahn | 463/46 |
| 6,778,226 | B1 * | 8/2004 | Eshelman et al. | 348/836 |
| 6,800,030 | B2 * | 10/2004 | Acres | 463/25 |
| 6,945,685 | B1 * | 9/2005 | Sokolov et al. | 362/632 |
| 6,976,915 | B2 * | 12/2005 | Baker et al. | 463/1 |
| 7,072,849 | B1 * | 7/2006 | Filepp et al. | 705/14.66 |
| 7,324,080 | B1 * | 1/2008 | Hu et al. | 345/102 |
| 7,396,282 | B2 | 7/2008 | Gauselmann | 463/46 |
| 7,682,249 | B2 | 3/2010 | Winans et al. | 463/31 |
| 7,811,170 | B2 | 10/2010 | Winans et al. | 463/31 |
| 7,841,947 | B2 | 11/2010 | Gauselmann | 463/46 |
| 7,864,204 | B2 * | 1/2011 | Overes | 345/102 |
| 7,894,000 | B2 * | 2/2011 | Gutta et al. | 348/603 |
| 8,154,669 | B2 * | 4/2012 | Wang et al. | 348/801 |
| 8,177,390 | B2 * | 5/2012 | Miskin | 362/234 |
| 2002/0173354 | A1 | 11/2002 | Winans et al. | 463/20 |
| 2003/0002246 | A1 * | 1/2003 | Kerr | 361/683 |
| 2003/0043314 | A1 * | 3/2003 | Lee et al. | 349/65 |
| 2003/0076281 | A1 * | 4/2003 | Morgan et al. | 345/44 |
| 2003/0076670 | A1 * | 4/2003 | Siegel et al. | 362/85 |
| 2003/0166417 | A1 * | 9/2003 | Moriyama et al. | 463/46 |
| 2003/0195045 | A1 * | 10/2003 | Kaminkow et al. | 463/47 |
| 2004/0036622 | A1 * | 2/2004 | Dukach et al. | 340/691.6 |
| 2004/0038726 | A1 * | 2/2004 | Inoue | 463/20 |
| 2004/0125234 | A1 * | 7/2004 | Kim | 348/552 |
| 2004/0136189 | A1 * | 7/2004 | Vanderschuit | 362/235 |
| 2004/0181989 | A1 * | 9/2004 | Miller | 40/716 |
| 2004/0185938 | A1 * | 9/2004 | Moore et al. | 463/46 |
| 2005/0085292 | A1 * | 4/2005 | Inamura | 463/25 |
| 2005/0128751 | A1 * | 6/2005 | Roberge et al. | 362/276 |
| 2005/0130732 | A1 * | 6/2005 | Rothschild et al. | 463/20 |
| 2005/0153780 | A1 | 7/2005 | Gauselmann | 463/47 |
| 2005/0261057 | A1 | 11/2005 | Bleich et al. | 463/30 |
| 2006/0063591 | A1 | 3/2006 | Gauselmann | 463/30 |
| 2007/0021204 | A1 * | 1/2007 | Eloff et al. | 463/30 |
| 2007/0041094 | A1 * | 2/2007 | Dominguez-Montes | 359/462 |
| 2007/0093290 | A1 | 4/2007 | Winans et al. | 463/30 |
| 2007/0103918 | A1 * | 5/2007 | Lin | 362/427 |
| 2007/0164975 | A1 * | 7/2007 | Lim et al. | 345/102 |
| 2007/0165406 | A1 * | 7/2007 | Wang | 362/253 |
| 2007/0287528 | A1 * | 12/2007 | Hirato et al. | 463/20 |
| 2008/0039213 | A1 | 2/2008 | Cornell et al. | 463/46 |
| 2008/0062700 | A1 * | 3/2008 | Hayashi et al. | 362/294 |
| 2008/0129662 | A1 * | 6/2008 | Yoo et al. | 345/84 |
| 2008/0207303 | A1 * | 8/2008 | Rasmussen | 463/20 |
| 2008/0268942 | A1 * | 10/2008 | DeRuyter | 463/22 |
| 2009/0045723 | A1 * | 2/2009 | Ishikawa | 313/504 |
| 2009/0046455 | A1 * | 2/2009 | Yoshino et al. | 362/234 |
| 2009/0149242 | A1 * | 6/2009 | Woodard et al. | 463/21 |
| 2009/0174346 | A1 | 7/2009 | Hwang et al. | 315/294 |
| 2010/0053229 | A1 * | 3/2010 | Krijn et al. | 345/690 |
| 2010/0097408 | A1 * | 4/2010 | Michael Marcellinus et al. | 345/690 |
| 2010/0227667 | A1 * | 9/2010 | Englman et al. | 463/20 |
| 2010/0238664 | A1 * | 9/2010 | Steenbergen | 362/276 |

FOREIGN PATENT DOCUMENTS

| | | | |
|---|---|---|---|
| JP | 2008-086589 | A | 4/2008 |
| WO | WO 01/34262 | A1 | 5/2001 |
| WO | WO 02/091319 | A2 | 11/2002 |
| WO | WO 2004/075128 | A1 | 9/2004 |
| WO | WO 2004/075129 | A1 | 9/2004 |
| WO | WO 2006/036486 | A1 | 4/2006 |
| WO | WO 2009/061457 | A1 | 5/2009 |

OTHER PUBLICATIONS

PCT International Search Report for International Application No. PCT/US2009/061128 dated Dec. 2, 2009 (2 pages).

PCT International Written Opinion for International Application No. PCT/US2009/061128 dated Dec. 2, 2009 (5 pages).

* cited by examiner

GAMING MACHINE WITH IMPROVED LIGHTING ARRANGEMENT

CROSS REFERENCE TO RELATED APPLICATIONS

This application is a U.S. national stage of International Application No. PCT/US2009/061128, titled "Gaming Machine With Improved Lighting Arrangement" and filed on Oct. 19, 2009, which claims priority to U.S. Provisional Patent Application Ser. No. 61/107,083, titled "Gaming Machine With Improved Lighting Arrangement" and filed on Oct. 21, 2008, each of which is incorporated herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to an emotive lighting arrangement integrated in a gaming cabinet for providing ambient lighting to a gaming environment.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One problem associated with current gaming machines is that they fail to enhance game play experience or to add ambiance to a gaming environment in a controllable and tasteful way. For example, many current gaming machines completely fail to provide any type of ambient light to further enhance visual effects displayed on a game display.

Although other current gaming machines make an attempt to provide some type of ambient light, these gaming machines fail to do so without distracting the player or to do it in a tasteful way. For example, some current gaming machines include add-on elements, e.g., illuminated bezels, that are generally considered distracting and indiscrete to the player. The add-on elements fail to functionally and aesthetically integrate with the gaming cabinet and, therefore, detract from an enhanced game play experience. In addition, such elements fail to extend and emphasize the game experience beyond the traditional electronic display borders. As such, current ambient elements, such as add-on bezels, are obtrusive and unpleasant in character and tend to either distract the player from the gaming event or they disrupt attempts to create a pleasant visual ambience for the player.

Therefore, a need exists for a gaming machine that will provide a solution to the problems discussed above and to other problems.

SUMMARY OF THE INVENTION

According to one aspect of the present invention, a gaming machine includes a cabinet frame, a display, and an emotive lighting area. The cabinet frame has a cabinet surface visible to and facing a player position in front of the gaming machine. The display is mounted to the cabinet frame and is configured to display a randomly selected outcome from a wagering game. The emotive lighting area is integrated with the cabinet frame on the cabinet surface, proximate the display, and is separate from the display. The emotive lighting area includes a light source and a reflective surface, each of the light source and the reflective surface being concealed within the cabinet frame such that they are not viewable from the player position, the reflective surface configured to receive light directly from the light source and to reflect the light to a viewable area.

According to yet another aspect of the invention, a gaming machine includes a cabinet, a display, a plurality of diffuse lighting areas, and a transparent chrome area. The display is mounted to the cabinet and is configured to display a randomly selected outcome from a wagering game, the randomly selected outcome being selected from a plurality of outcomes in response to receiving a wager input. The diffuse lighting areas are integrated with the cabinet and positioned alongside the display. The diffuse lighting areas include a first light source concealed from plain sight within the cabinet, a first reflective surface concealed from plain sight within the cabinet and configured to directly receive light from the first light source, and a diffusion surface positioned in plain sight and configured to directly receive light from the first reflective surface, the diffusion surface being part of a cabinet surface. The transparent chrome area is integrated with the cabinet and positioned alongside the display. The transparent chrome area includes a second light source concealed from plain sight within the cabinet, a second reflective surface concealed from plain sight within the cabinet and configured to directly receive light from the second light source, and a transparent member configured to enclose the second light source and the second reflective surface within the cabinet. The transparent member includes a chrome coating such that the second light source is concealed from plain sight when the second light source is deactivated and only some emitted light is transmitted when the second light source is activated.

According to yet another aspect of the invention, a gaming machine includes a cabinet, a display, and a plurality of diffuse lighting areas. The display is mounted to the cabinet and is configured to display a randomly selected outcome from a wagering game, the randomly selected outcome being selected from a plurality of outcomes in response to receiving a wager input. The diffuse lighting areas are integrated with the cabinet and each includes a light source, a reflective surface, and a diffusion surface. The reflective surface receives emitted light by the light source and is positioned within the cabinet such that the reflective surface redirects the emitted light towards the diffusion surface. The diffusion surface is part of a cabinet surface and is configured to diffuse light received from the reflective surface such that the diffuse light is visible outside the cabinet.

According to yet another aspect of the invention, a gaming machine includes a cabinet, a display, and a transparent lighting area. The display is mounted to the cabinet and is configured to display a randomly selected outcome from a wagering game, the randomly selected outcome being selected from a plurality of outcomes in response to receiving a wager input. The transparent lighting area is integrated with the cabinet and includes a light source, at least one reflective surface, and a transparent chrome member. The light source is mounted within an interior area of the cabinet, and the reflective surface is mounted proximate the light source within the interior area of the cabinet. The transparent chrome member is mounted generally flush with a cabinet surface to cover the light source and the reflective surface. The transparent chrome member has a coating of up to 75% of chrome material to provide a two-way mirror effect in which ambient light is reflected when the interior area is dark and in which light from the interior area is visible when the light source is activated.

According to yet another aspect of the invention, a gaming system includes a plurality of interconnected gaming machines for playing a wagering game. Each of the gaming machines includes a display, a game controller, a diffuse lighting area, and an emotive lighting controller. The display is mounted to a gaming cabinet. The game controller is coupled to the display and is operative to cause the displaying of a randomly selected event in a wagering game. The diffuse lighting area is integrated with the cabinet and includes a light source, a reflective surface, and a diffusion surface. The reflective surface receives emitted light by the light source and is positioned within the cabinet such that the reflective surface redirects the emitted light towards the diffusion surface. The diffusion surface is part of a cabinet surface and is configured to diffuse light received from the reflective surface such that the diffuse light is visible outside the cabinet. The emotive lighting controller is coupled to the light source and to the game controller and, based on the event in the wagering game, is operative to synchronize colors and light shows displayed on the display and in the diffuse lighting area.

Additional aspects of the invention will be apparent to those of ordinary skill in the art in view of the detailed description of various embodiments, which is made with reference to the drawings, a brief description of which is provided below.

DETAILED DESCRIPTION

Figure 1A:
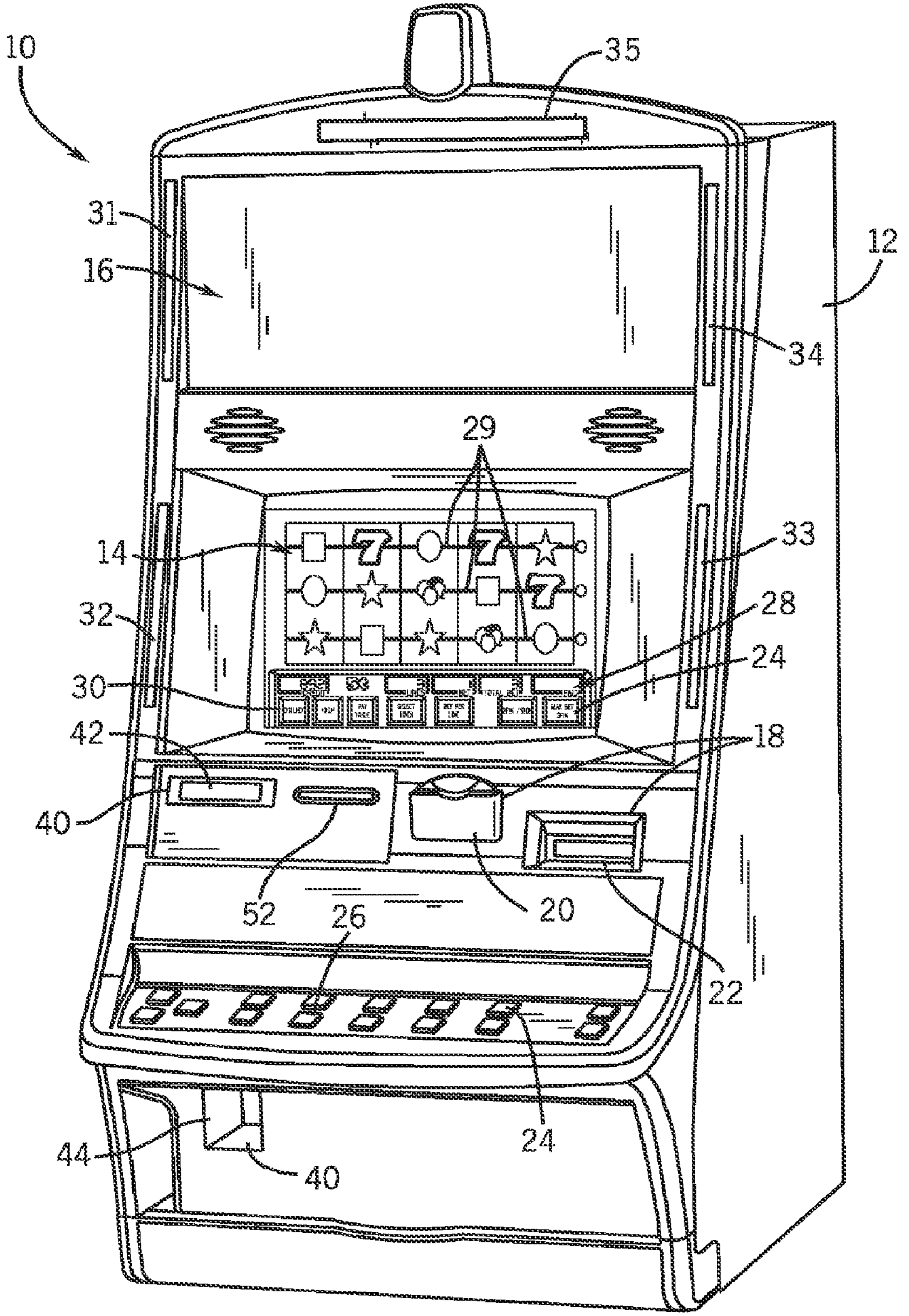
FIG. 1A is a perspective view of a free standing gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1A, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10. The gaming machine 10 also includes a plurality of emotive lighting areas 31-35, which are described in more detail below in reference to FIGS. 3A-6.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1A). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1A, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 29. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10. Alternatively yet, in the "slant-top" version of the gaming machine the primary display 14 may be oriented in an upright position (i.e., in a generally vertical position or nearly vertical position).

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 29 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1A as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
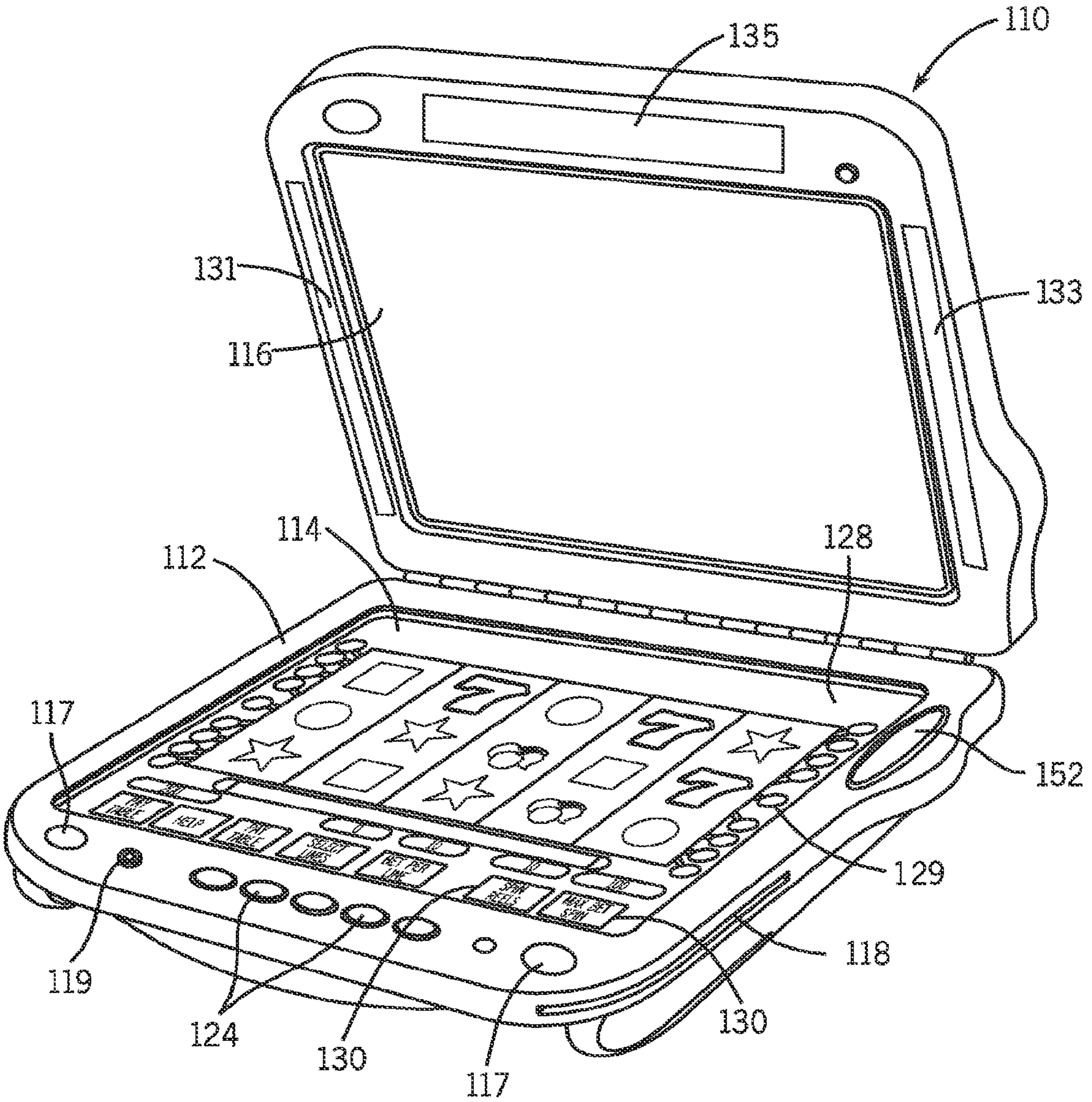
FIG. 1B is a perspective view of a handheld gaming machine embodying the present invention.

Depicted in FIG. 1B is a handheld or mobile gaming machine 110. Like the free standing gaming machine 10, the handheld gaming machine 110 is preferably an electronic gaming machine configured to play a video casino game such as, but not limited to, slots, keno, poker, blackjack, and roulette. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1B, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status. The handheld gaming machine 110 also includes a plurality of emotive lighting areas 131, 133, and 135, which are described below in more detail in reference to FIGS. 3A-6.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen 128 mounted to a primary display 114 and/or secondary display 116. In one aspect, the touch screen 128 is matched to a display screen having one or more selectable touch keys 130 selectable by a user's touching of the associated area of the screen using a finger or a tool, such as a stylus pointer. A player enables a desired function either by touching the touch screen 128 at an appropriate touch key 130 or by pressing an appropriate push button 126 on the button panel. The touch keys 130 may be used to implement the same functions as push buttons 126. Alternatively, the push buttons may provide inputs for one aspect of the operating the game, while the touch keys 130 may allow for input needed for another aspect of the game. The various components of the handheld gaming machine 110 may be connected directly to, or contained within, the casing 112, as seen in FIG. 1B, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably takes the form of a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 18 or an assignment of credits stored on the handheld gaming machine via the touch screen keys 130, player input device 124, or buttons 126) on the handheld gaming machine 110. In at least some aspects, the basic game may comprise a plurality of symbols arranged in an array, and includes at least one payline 129 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1B, comprises a biometric sensing device.

Figure 2:
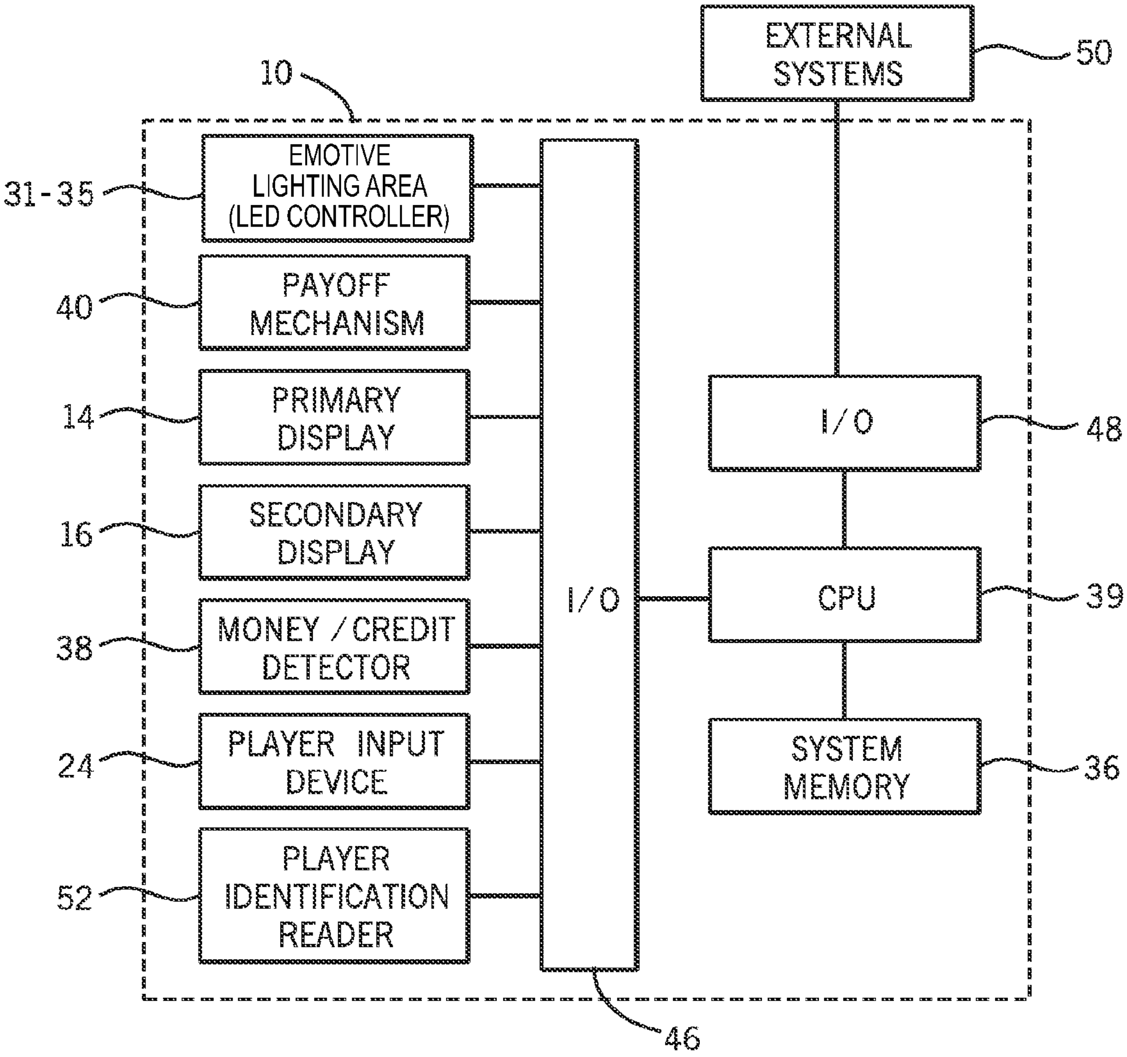
FIG. 2 is a block diagram of a control system suitable for operating the gaming machines of FIGS. 1A and 1B.

Turning now to FIG. 2, the various components of the gaming machine 10 are controlled by a central processing unit (CPU) 39, also referred to herein as a controller or processor (such as a microcontroller or microprocessor). To provide gaming functions, the controller 39 executes one or more game programs stored in a computer readable storage medium, in the form of memory 36. The controller 39 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 39 may include one or more microprocessors, including but not limited to a master processor, a slave processor, and a secondary or parallel processor.

The controller 39 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 39 is also connected to, and controls, the primary display 14, the player input device 24, and a payoff mechanism 40. The payoff mechanism 40 is operable in response to instructions from the controller 39 to award a payoff to the player in response to certain winning outcomes that might occur in the basic game or the bonus game(s). The payoff may be provided in the form of points, bills, tickets, coupons, cards, etc. For example, in FIG. 1A, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 39 and both the peripheral components of the gaming machine 10 and external systems 50 occur through input/output (I/O) circuits 46, 48. More specifically, the controller 39 controls and receives inputs from the peripheral components of the gaming machine 10 through the input/output circuits 46. Further, the controller 39 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

The controller 39 can be coupled to the emotive lighting areas 31-35 and communicates and/or controls lighting aspects of the emotive lighting areas 31-35. For example, the emotive lighting areas 31-35 may include a dedicated LED controller that is configured to coordinate light shows of the gaming machine 10. The dedicated LED controller can synchronize with the controller 39 such that the light shows are coordinated with visual effects displayed in one or more of the primary display 14 and the secondary display 16. Optionally, each one of the emotive lighting areas 31-35 can include its own LED controller. Further details regarding the LED controller are provided below in FIGS. 5A-6.

Controller 39, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 39 may comprise one or more controllers or processors. In FIG. 2, the controller 39 in the gaming machine 10 is depicted as comprising a CPU, but the controller 39 may alternatively comprise a CPU in combination with other components, such as the I/O circuits 46, 48 and the system memory 36. The controller 39 may reside partially or entirely inside or outside of the machine 10. The control system for a handheld gaming machine 110 may be similar to the control system for the free standing gaming machine 10 except that the functionality of the respective on-board controllers may vary.

The gaming machines 10,110 may communicate with external systems 50 (in a wired or wireless manner) such that each machine operates as a "thin client," having relatively less functionality, a "thick client," having relatively more functionality, or through any range of functionality therebetween (e.g., a "rich client"). As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 39 on board the gaming machine processes display information to be displayed on the display (s) of the machine. In an alternative "rich client" configuration, the server determines game outcomes, while the controller 39 on board the gaming machine executes game code and processes display information to be displayed on the display(s) of the machines. In yet another alternative "thick client" configuration, the controller 39 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10,110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

Security features are advantageously utilized where the gaming machines 10,110 communicate wirelessly with external systems 50, such as through wireless local area network (WLAN) technologies, wireless personal area networks (WPAN) technologies, wireless metropolitan area network (WMAN) technologies, wireless wide area network (WWAN) technologies, or other wireless network technologies implemented in accord with related standards or protocols (e.g., the Institute of Electrical and Electronics Engineers (IEEE) 802.11 family of WLAN standards, IEEE 802.11i, IEEE 802.11r (under development), IEEE 802.11w (under development), IEEE 802.15.1 (Bluetooth), IEEE 802.12.3, etc.). For example, a WLAN in accord with at least some aspects of the present concepts comprises a robust security network (RSN), a wireless security network that allows the creation of robust security network associations (RSNA) using one or more cryptographic techniques, which provides one system to avoid security vulnerabilities associated with IEEE 802.11 (the Wired Equivalent Privacy (WEP) protocol). Constituent components of the RSN may comprise, for example, stations (STA) (e.g., wireless endpoint devices such as laptops, wireless handheld devices, cellular phones, handheld gaming machine 110, etc.), access points (AP) (e.g., a network device or devices that allow(s) an STA to communicate wirelessly and to connect to a(nother) network, such as a communication device associated with I/O circuit(s) 48), and authentication servers (AS) (e.g., an external system 50), which provide authentication services to STAs. Information regarding security features for wireless networks may be found, for example, in the National Institute of Standards and Technology (NIST), Technology Administration U.S. Department of Commerce, Special Publication (SP) 800-97, Establishing Wireless Robust Security Networks: A Guide to IEEE 802.11, and SP 800-48, Wireless Network Security: 802.11, Bluetooth and Handheld Devices, both of which are incorporated herein by reference in their entirety.

Figure 3A:
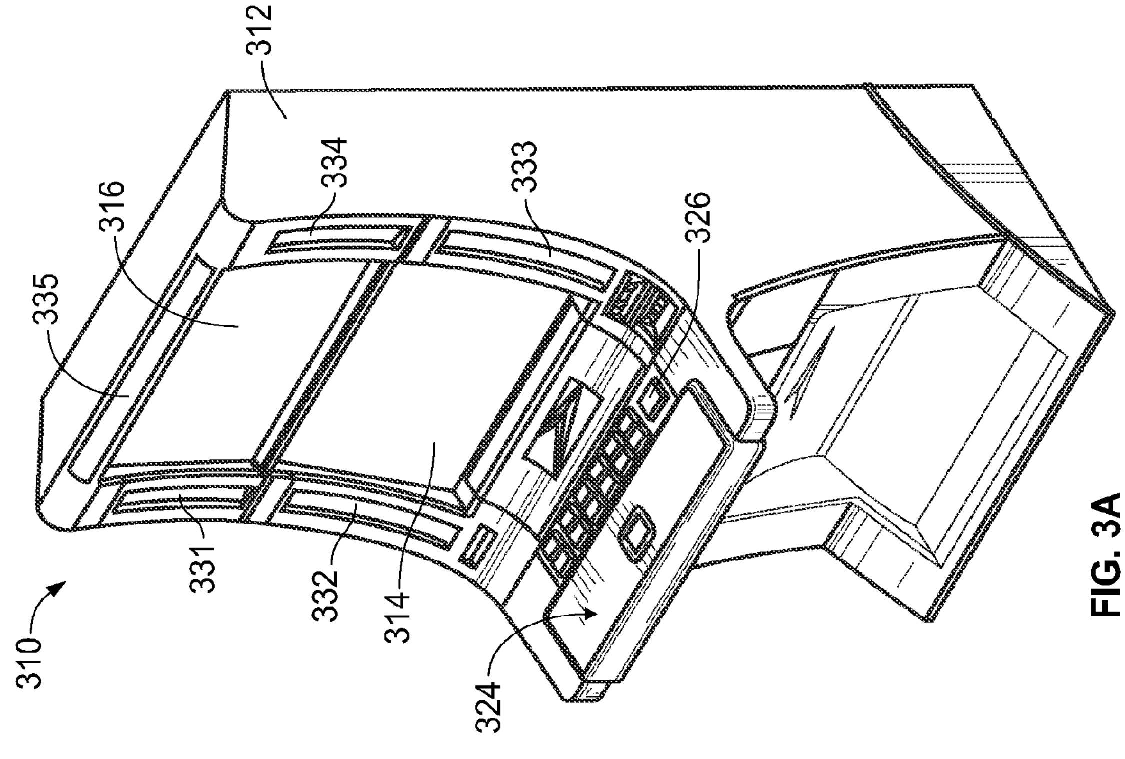
FIG. 3A is a perspective view of a gaming machine illustrating an emotive light arrangement in a deactivate mode, according to one embodiment of the present invention.
Figure 3B:
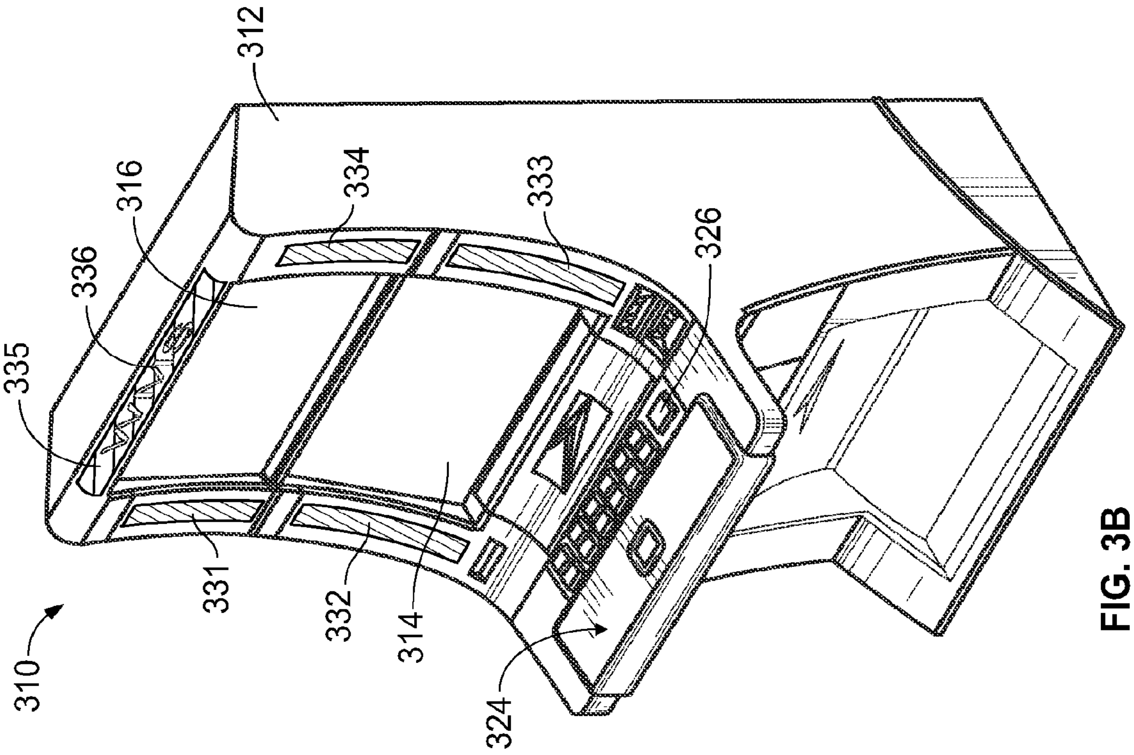
FIG. 3B is a perspective view showing the emotive light arrangement of FIG. 3A in an activated mode.

Referring now to FIGS. 3A and 3B, a gaming machine 310 is generally similar to the gaming machine 10 described above and includes a gaming cabinet 312 (also referred to as a housing) in which a primary display 314 and a secondary display 316 are mounted. The gaming cabinet forms a general frame around each of the primary display 314 and the secondary display 316. A player input area 324 is located generally below the primary display 314 and includes a plurality of buttons 326 for operating the gaming machine 310.

The gaming machine 310 further includes a plurality of emotive lighting areas 331-335, which are positioned proximate the primary display 314 and the secondary display 316. The emotive lighting areas 331-335 are configured to enhance communication with players and to positively affect the gaming environment. For example, the communication can be used to (i) attract players to games from a distance with colored light shows (including, e.g., coordination of light shows across banks of games); (ii) heighten anticipation during game play by using colors and synchronous lighting displays for conveying emotion and drama; (iii) celebrate wins during a bonus round or during/after an award; and (iv) close game play and wish a player "farewell" after cashing out.

Emotive lighting areas can include at least two specific types of emotive lighting—a diffuse (and indirect) lighting area and a transparent chrome lighting area. The diffuse lighting area generally includes the actual surface of the gaming cabinet to diffuse and/or reflect lighting indirectly. Actual light sources are hidden within the cabinet and light only becomes visible when the light sources are activated. To create a more stunning effect, a low reflective metallic finish (such as satin chrome) may be applied to the diffusing surface.

The transparent chrome lighting area incorporates, in general, a two-way mirror effect. For example, a semi-transparent reflective member (e.g., a ¾ minor) visible to a player shields or covers an interior light source located inside the gaming cabinet. The semi-transparent member reflects all ambient light when the covered interior is dark. However, when the interior light source is activated, the lighting becomes visible and the semi-transparent reflective member virtually disappears. Although two-way minor effects have been integrated, for example, into automotive exterior lighting, those two-way minor effects have not been incorporate in a wagering environment the same way as the disclosed embodiments of the present application.

In the illustrated embodiment, the emotive lighting areas 331-335 include four diffuse lighting areas: a top-left diffuse lighting area 331, a bottom-left diffuse lighting area 332, a bottom-right diffuse lighting area 333, a top-right diffuse lighting 334; and a single transparent lighting area 335. The diffuse lighting areas 331-334 are generally vertically oriented on either side of the main display 314 and the secondary display 316. The transparent lighting area 335 is generally horizontally oriented above the secondary display 316.

When the light sources are not activated (illustrated in FIG. 3A), the emotive lighting areas 331-335 appear integral with and as part of the gaming cabinet 312. When the light sources are activated (illustrated in FIG. 3B), the emotive lighting areas 331-335 enhance the visual ambience of the gaming environment while still retaining the overall aesthetic integrity of the gaming cabinet 312.

Optionally, a concealed effect 336 can be revealed only when the light source is activated. For example, as illustrated in FIG. 3B, the concealed effect 336 can display a manufacturer logo, e.g., "WMS", when the light source of the transparent lighting area 335 is activated. In other examples, several logos can be placed in the transparent lighting area 335 and are illuminated only when a specific game is being played. The logos can represent, for example, brands, themes, or theme families. Optionally, the logos can be color coded for easier discernment by a player.

Figure 4A:
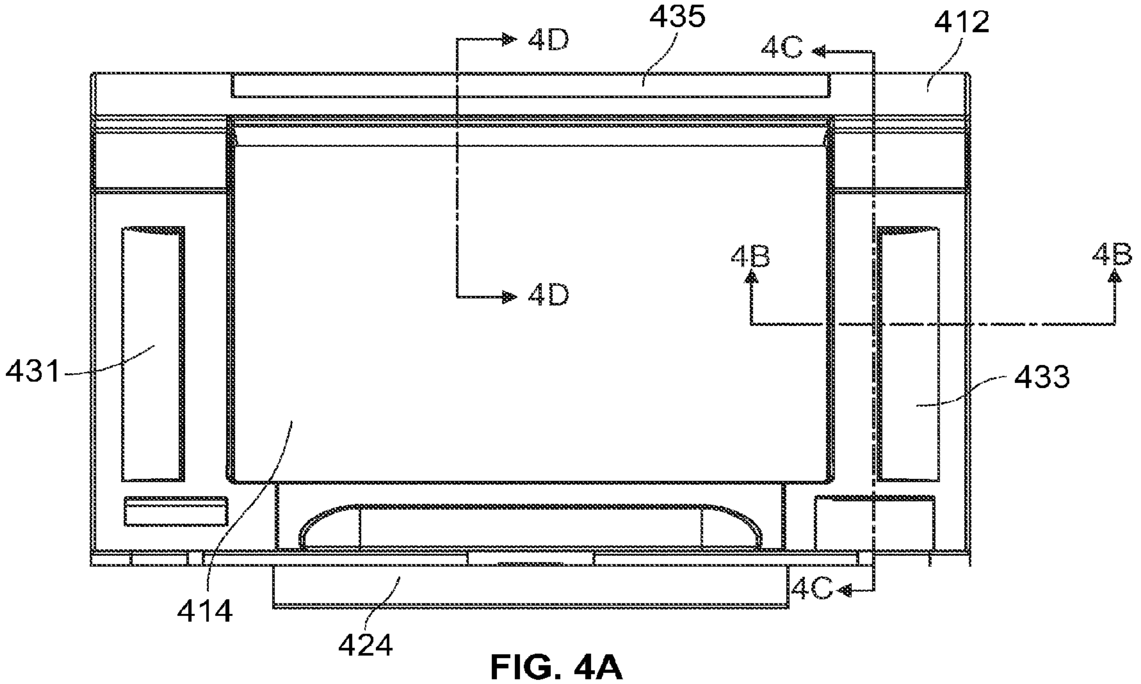
FIG. 4A is a front view showing a display area of a gaming machine, according to another embodiment of the present invention.

Referring to FIG. 4A, a display area of a gaming machine includes a cabinet 412 (shown in part) to which a display 414 is mounted. A player input area 424 is located below the display 414. Three emotive lighting areas are positioned next to the display 414. Specifically, the three emotive lighting areas include a left diffuse lighting area 431, a right diffuse lighting area 433, and a top transparent lighting area 435.

Figure 4B:
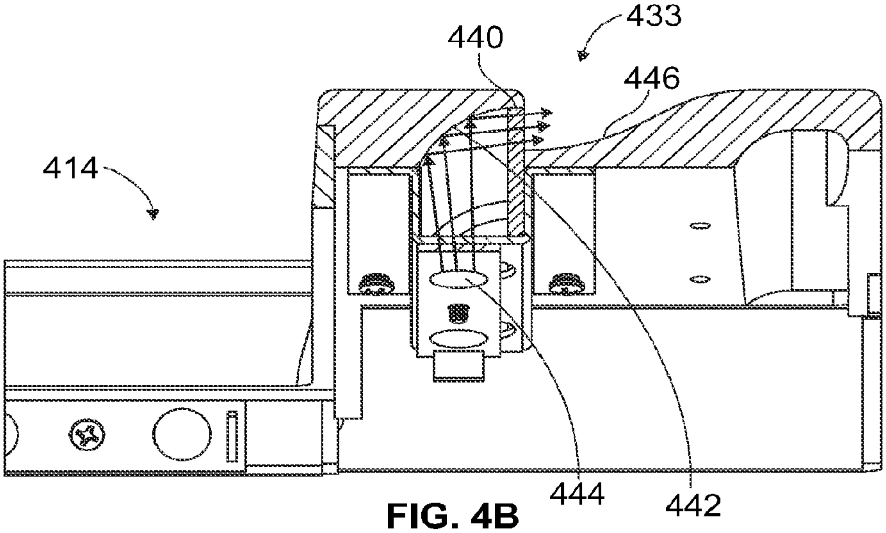
FIG. 4B is a cross-sectional view along line 4B-4B in FIG. 4A.
Figure 4C:
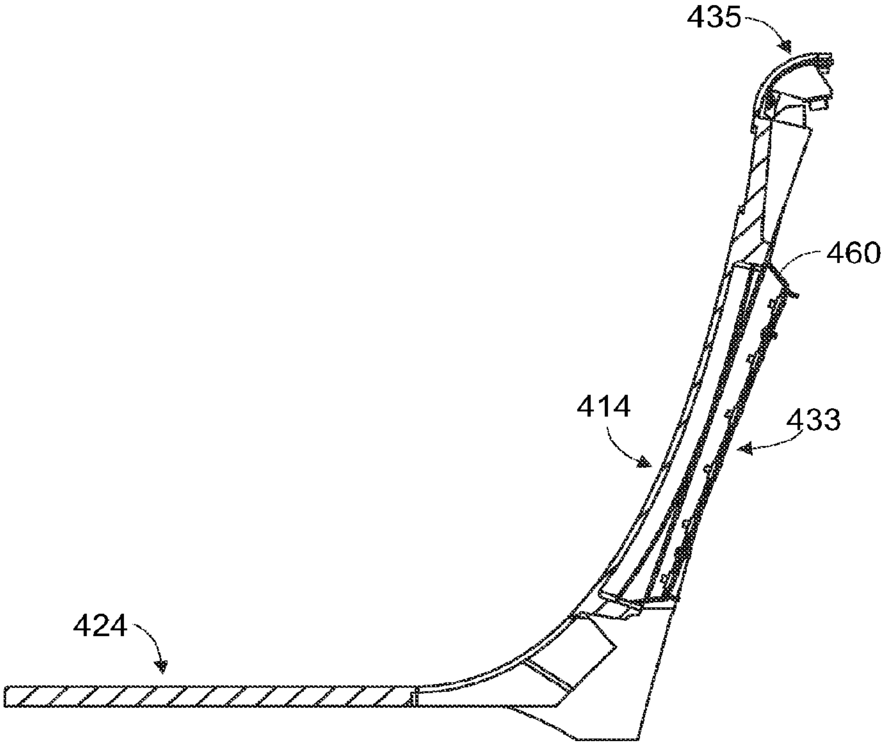
FIG. 4C is a cross-sectional view along line 4C-4C in FIG. 4A.

Referring to FIGS. 4B-4C, the right diffuse lighting area 433 includes an optional transparent lens 440, a reflective surface 442, and a light-emitting diode (LED) array board 444 having a plurality of LEDs. The LED array board 444 is optionally mounted in a LED housing 460 (illustrated in FIG. 4C).

The transparent lens 440 is positioned to cover within the cabinet 412 the reflective surface 442 and the LED array board 444. The transparent lens 440 can be made, at least in part, from any transparent or semi-transparent material. For example, the transparent lens 440 can be made from a polycarbonate (PC) material.

The reflective surface 442, which is generally highly reflective, is configured such that light emitted from the LEDs (illustrated with arrows in FIG. 4B) is reflected towards the transparent lens 440. For example, the position and shape of the reflective surface 442 allows it to receive light in a generally vertical direction but reflects the light in a generally horizontal direction. Optionally, the reflective surface 442 includes a minor quality coating.

Figure 4D:
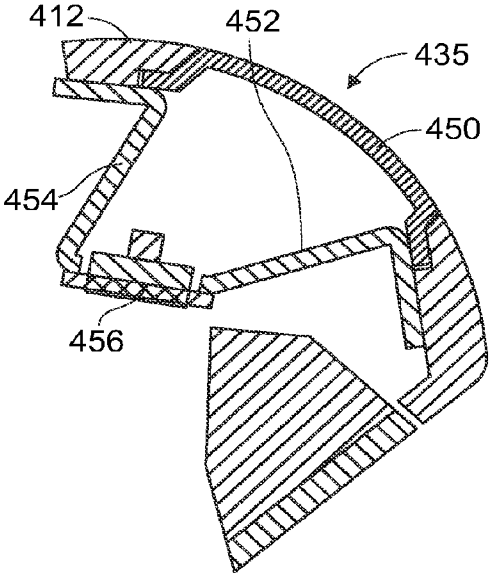
FIG. 4D is a cross-sectional view along line 4D-4D in FIG. 4A.

Referring to FIG. 4D, the top transparent lighting area 435 includes a transparent chrome member 450, a couple of reflective surfaces 452, 454, and a LED array board 456 (with a plurality of LEDs). The transparent chrome member 450 is generally made from a transparent material and is coated with up to 75% of a mirror reflective material. Thus, the transparent chrome member 450 provides a two-way mirror effect. The transparent chrome member 450 is positioned such that it completely encloses the reflective surfaces 452, 454 and the LED array board 456 within the cabinet 412.

The reflective surfaces 452, 454 are generally covered (e.g. coated) with a reflective material and can function, simultaneously, as both a light reflector and a LED housing. The physical configuration of the LEDs and the reflective surfaces 452, 454 can be optimized in accordance with desired parameters. For example, if a stronger ambient light is desired, the reflective surface 452 may be positioned angled closer to the LED array board 456. In contrast, if a weaker ambient light is desired, the reflective surface 452 may be positioned angled farther from the LED array board 456.

Optionally, an optical diffuser may be added to affect the appearance, quality, and illumination level of the light. For example, one effect of the optical diffuser is to cause the appearance of a seamless blending of the discrete LEDs into a single light.

Figure 5A:
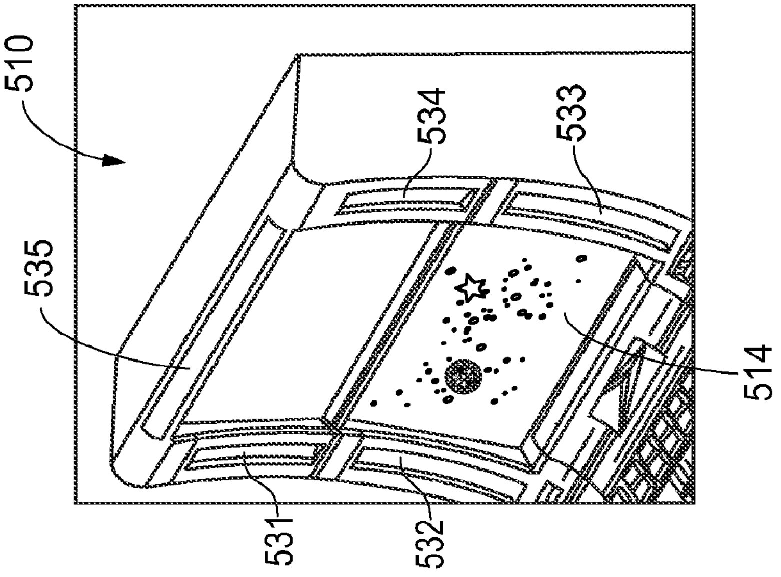
FIG. 5A is a perspective view of an upper part of a gaming machine illustrating a first instance of a visual effects show, according to yet another embodiment of the present invention.
Figure 5B:
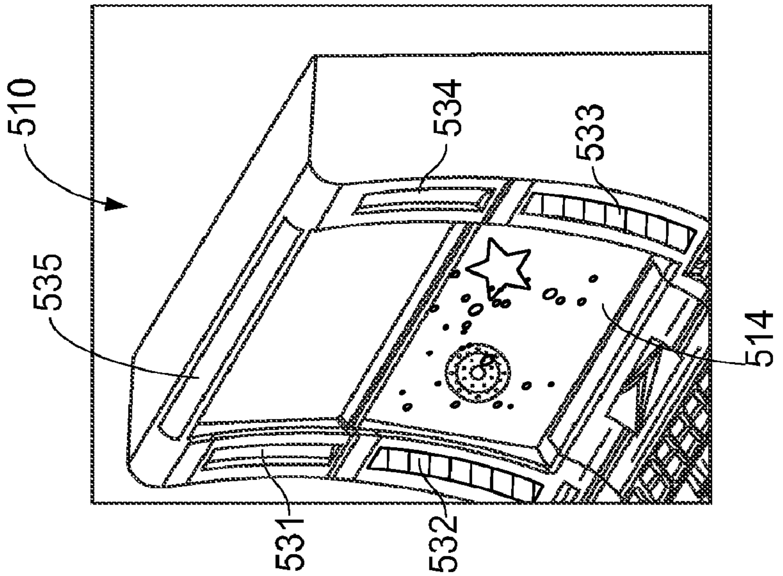
FIG. 5B shows a second instance of the visual effects show illustrated in FIG. 5A.
Figure 5C:
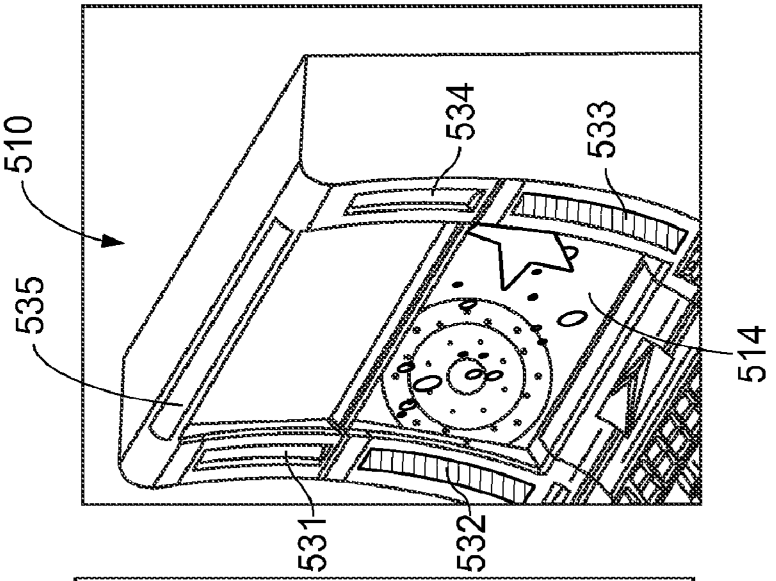
FIG. 5C shows a third instance of the visual effects show illustrated in FIG. 5A.

Referring to FIGS. 5A-5C, a gaming machine 510 includes a primary display 514 and a plurality of emotive lighting areas 531-535. The emotive lighting areas 531-535 are individually controlled and synchronized by a LED controller (as discussed above in reference to FIG. 2) in a single game to create elaborate and coordinated light shows. For example, the emotive lighting areas 531-535 can be controlled to create multi-colored light shows as typically seen in top boxes of gaming machines.

In addition to provide emotive lighting, the emotive lighting areas 531-535 can be controlled to coordinate with visual effects displayed on the primary display 514 (or any other display). For example, the gaming machine 510 can include an "attract mode" in which the primary display 514 shows representatively a galaxy map. Initially, in FIG. 5A, the galaxy map is shown to be far away and, simultaneously, the emotive lighting areas 532, 533 adjacent to the primary display 514 are shown in a deactivated state (i.e., internal LEDs are off). In a second instance, in FIG. 5B, the galaxy map is shown closer to the player and, simultaneously, the emotive lighting areas 532, 533 are in a dimmed activated state. In a third instance, in FIG. 5C, the galaxy map is now even closer to the player and, simultaneously, the emotive lighting areas 532, 533 are in a bright activated state.

Optionally, the coordination of the visual effects on the primary display 514 and the emotive lighting areas 532, 533 can be choreographed or coordinated with audio output. For example, in the first instance the audio output can be a soft peaceful sound that increases in volume and intensity as the galaxy map is shown closer to the player.

Visual effects and sound output can be coordinated to stimulate player interest from players near and far. For example, visual attract screens can include musical notes having forms of animation (or various visualizations) that take actions based on sound notes. Player interest can be stimulated based on rhythm of the sound choreographed with the forms of animation.

Figure 6:
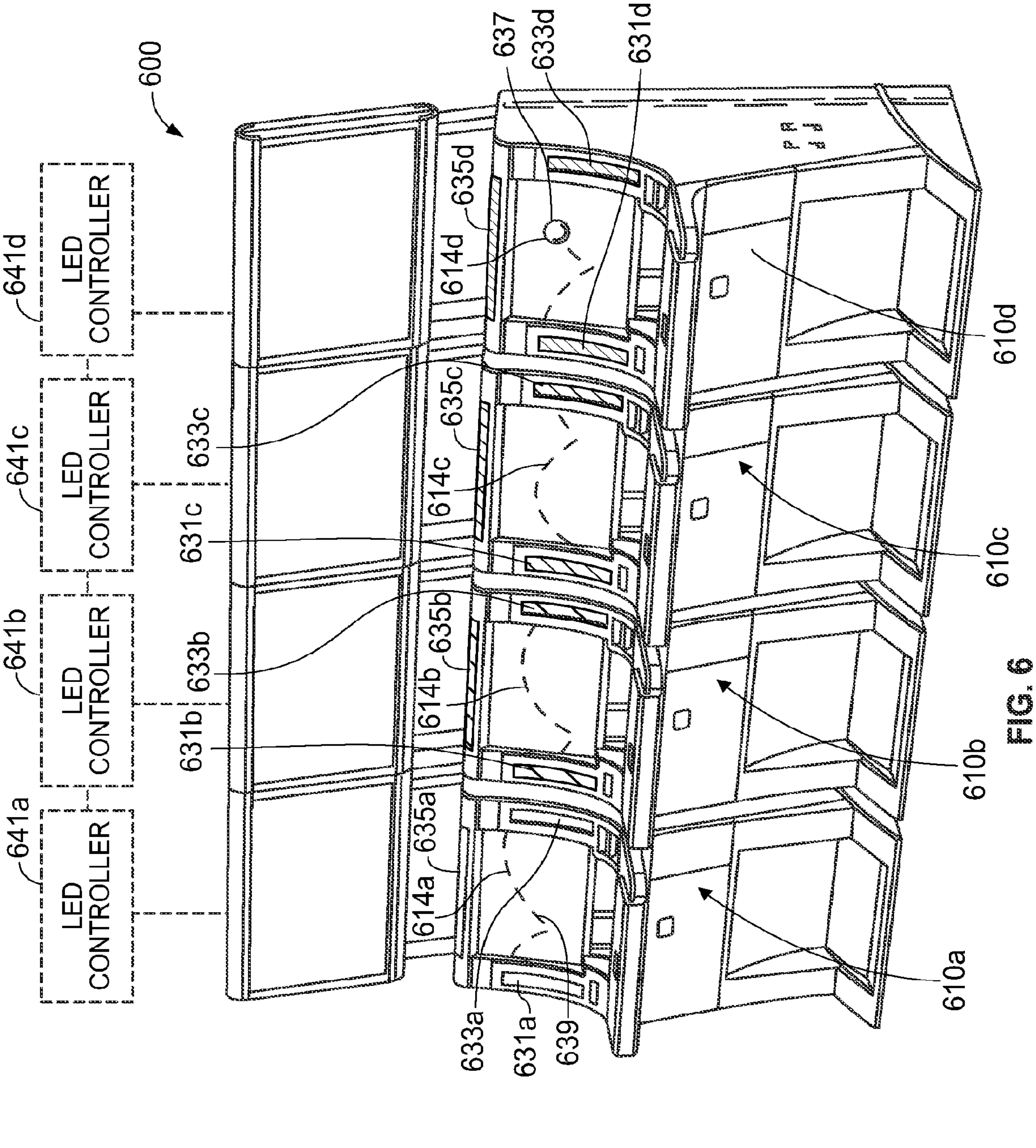
FIG. 6 is a perspective view of a bank of interconnected gaming machines, according to yet another embodiment of the present invention.

Referring to FIG. 6, a bank of gaming machines 600 includes four gaming machines 610*a*-610*d*. Each gaming machine 610*a*-610*d* includes a respective primary display 616*a*-616*d* and respective emotive lighting areas 631*a*-631*d*, 633*a*-633*d*, and 635*a*-635*d*. Each gaming machine 610*a*-610*d* further includes a dedicated LED controller 641*a*-641*d*. The bank of gaming machines 600 can include visual effects across at least some of the gaming machines 610*a*-610*d* such that the emotive lighting areas 631*a*-631*d*, 633*a*-633*d*, and 635*a*-635*d* are coordinated with each other, individually or as a group, and with other components, including the primary displays 616*a*-616*d*. In alternative embodiments, the coordination can include top boxes, bank signage, secondary displays, etc.

For example, the bank 600 can include an "attract mode" (during which one or more of the gaming machines 610*a*-610*d* are idle) in which visual effects are coordinated across all the gaming machines 610*a*-610*d*. As illustrated, a ball 637 begins bouncing in the primary display 614*a* of a left-most gaming machine 610*a* and continues bouncing through each primary display 614*a*-614*d* until it reaches the primary display 614*d* of a right-most gaming machine 610*d*. As the ball 637 continues bouncing, a trail 639 is left behind the ball in previous ones of the primary displays 610*a*-610*c*.

As the ball 637 moves from one primary display 614*a*-614*d* to another primary display 614*a*-614*d*, the emotive lighting areas 631*a*-631*d*, 633*a*-633*d*, and 635*a*-635*d* get brighter from left to right. For example, the emotive lighting areas 631*d*, 633*d*, and 635*d* of the left-most gaming machine 610*d* are the brightest (because the ball 637 is currently illustrated in that gaming machine) and the emotive lighting areas 631*a*, 633*a*, and 635*a* of the right-most gaming machine 610*a* are the dimmest (or deactivated).

Any other type of visual effects and audio output can be coordinated to stimulate player interest. For example, the visual effects can travel across adjacent gaming machines while morphing along sound cues that illustrate one or more game themes.

The LED controllers 641*a*-641*d*, which can have similar functions and characteristics as the controller 39 described above in reference to FIG. 2, can be used to synchronize colors and shows between games, top boxes, and signs. Thus, the LED controllers 641*a*-641*d* can be used in each game, top box, and sign for coordinating the emotive lighting areas.

The LED controllers 641*a*-641*d* can be connected not only to the controller 39 of the respective gaming machine, but also to adjacent LED controllers. For example, the LED controller 641*a* of the left-most gaming machine 610*a* is connected to the adjacent LED controller 641*b* of the adjacent gaming machine 610*b*. The connection can be achieved, for example, via infra-red connections (for adjacent gaming machines), via hardwire connections (e.g., cables), or any other means. A connection method that is independent of the gaming machine controller 39 is preferred based on ease of implementation, maximum flexibility (because it allows synchronization of non-gaming devices), and minimal regulatory risk.

The LED controllers 641*a*-641*d* synchronize to allow a light show to be run across the entire bank 600. Synchronization can be achieved, for example, by having a single LED controller 641*a*-641*d* serve as a "master" controller. In another example, synchronization can be achieved by syncing clocks between controllers and running time-based light shows. Optionally, a bank layout may be selected from a list of images to ensure that the light shows run appropriately (e.g., to ensure that synchronization is achieved between a first gaming machine and a second gaming machine).

Optionally, the LED controllers 641*a*-641*d* can run a common attract show across the bank 600 in a default "idle" mode. Games can override the default mode by either modifying the default mode (e.g., changing the color but keeping the same chase pattern) or taking complete control. New light shows can be up-loaded from the game and/or from adjacent controllers.

One current trend in gaming establishments, such as casinos, is to include marquees with reduced brightness. As such, the LED controllers 641*a*-641*d* can adjust the relative brightness of the lighting between several levels. The adjustment can be done at the bank level, for example, to avoid having "dim" games stand out.

Optionally, light settings at the bank level can be accessible through machine hardware setup. However, in alternative embodiments the light settings can also be set from any controller.

Each of these embodiments and obvious variations thereof is contemplated as falling within the spirit and scope of the claimed invention, which is set forth in the following claims.

What is claimed is:

1. A gaming machine comprising:

a cabinet;

a display mounted to the cabinet and configured to display a randomly selected outcome from a wagering game, the randomly selected outcome being selected from a plurality of outcomes in response to receiving a wager input; and at least one emotive lighting area integrated with the cabinet and positioned alongside the display, the emotive lighting area including a light-emitting diode (LED) light source, a lens, and an external reflective diffusing surface, the lens being positioned between the LED light source and the external reflective diffusing surface, the LED light source being concealed within the cabinet, the external reflective diffusing surface being adjacent to the lens and being visible from a player position in front of the cabinet and being concave relative to the player position, the LED light source being configured to emit light that is directed through the lens and onto the external reflective diffusing surface which, in turn, reflects the light back off of the external reflective diffusing surface toward the player position in front of the gaming cabinet.

2. The gaming machine of claim 1, wherein the emotive lighting area further includes an interior reflective surface adjacent to the lens and concealed within the cabinet.

3. The gaming machine of claim 2, wherein the LED light source is configured to emit light onto the interior reflective surface which, in turn, reflects the light back off of the interior reflective surface and through the lens and onto the external reflective diffusing surface.

4. The gaming machine of claim 2, wherein the interior reflective surface is convex relative to the player position.

5. The gaming machine of claim 2, wherein the interior reflective surface has a surface finish that diffuses less light than the external reflective diffusing surface.

6. The gaming machine of claim 1, wherein the lens includes one or more of a transparent chrome material and a coating of up to 75% of mirror-reflective material.

7. The gaming machine of claim 1, wherein the lens is perpendicular to the direction of the light directed through the lens.

8. The gaming machine of claim 1, wherein the external reflective diffusing surface includes a reflective metallic finish material selected from a group consisting of a satin chrome material and a coating applied to a cabinet surface.

9. The gaming machine of claim 1, wherein the at least one emotive lighting area is arranged in a horizontal position or a vertical position alongside the display.

10. A gaming system for playing a wagering game, the gaming system comprising:

a plurality of interconnected gaming machines, each of the gaming machines including
 a cabinet,
 a display mounted to the cabinet and configured to display a randomly selected outcome from a wagering game, the randomly selected outcome being selected from a plurality of outcomes in response to receiving a wager input, and
 at least one emotive lighting area integrated with the cabinet and positioned alongside the display, the emotive lighting area including a light-emitting diode (LED) light source, a lens, and an external reflective diffusing surface, the lens being positioned between the LED light source and the external reflective diffusing surface, the LED light source being concealed within the cabinet, the external reflective diffusing surface being adjacent to the lens and being visible from a player position in front of the cabinet and being concave relative to the player position, the LED light source being configured to emit light that is directed through the lens and onto the external reflective diffusing surface which, in turn, reflects the light back off of the external reflective diffusing surface toward the player position in front of the gaming cabinet; and a controller operative to synchronize colors and light shows displayed by the emotive lighting areas of the gaming machines based on the randomly selected outcome of the wagering game at at least one of the gaming machines.

11. The gaming system of claim 10, wherein the controller is an emotive lighting controller located in the cabinet of at least one of the plurality of interconnected gaming machines.

12. The gaming system of claim 11, wherein the emotive lighting controller is operative to synchronize the plurality of interconnected gaming machines such that a light show can be run across the emotive lighting areas of all gaming machines of the plurality of interconnected gaming machines.

13. The gaming system of claim 10, wherein the controller is an emotive lighting controller located in the cabinet of each one of the plurality of interconnected gaming machines, only one emotive lighting controller serving as a master controller.

14. The gaming system of claim 10, wherein the at least one emotive lighting area includes at least one emotive lighting area that is horizontal relative to the display and at least one emotive lighting area that is vertical relative to the display.

15. The gaming system of claim 10, wherein the emotive lighting area further includes an interior reflective surface adjacent to the lens and concealed within the cabinet.

16. The gaming system of claim 15, wherein the LED light source is configured to emit light onto the interior reflective surface which, in turn, reflects the light back off of the interior reflective surface and through the lens and onto the external reflective diffusing surface.

17. The gaming system of claim 15, wherein the interior reflective surface is convex relative to the player position.

18. The gaming system of claim 15, wherein the interior reflective surface has a surface finish that diffuses less light than the external reflective diffusing surface.

19. The gaming system of claim 10, wherein the lens includes one or more of a transparent chrome material and a coating of up to 75% of mirror-reflective material.

20. The gaming system of claim 10, wherein the lens is perpendicular to the direction of the light directed through the lens.

* * * * *